(12) United States Patent
Avdokhin et al.

(10) Patent No.: US 11,433,483 B2
(45) Date of Patent: Sep. 6, 2022

(54) SYSTEM AND METHOD LASER FOR PROCESSING OF MATERIALS

(71) Applicant: IPG PHOTONICS CORPORATION, Oxford, MA (US)

(72) Inventors: Alexey Avdokhin, Oxford, MA (US); Pancho Tzankov, Shrewsbury, MA (US); Andrei Babushkin, Oxford, MA (US); Jonathan Ehrmann, Oxford, MA (US); Jeffrey Kmetec, Oxford, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 387 days.

(21) Appl. No.: 16/462,033

(22) PCT Filed: Nov. 20, 2017

(86) PCT No.: PCT/US2017/062604
§ 371 (c)(1),
(2) Date: May 17, 2019

(87) PCT Pub. No.: WO2018/094349
PCT Pub. Date: May 24, 2018

(65) Prior Publication Data
US 2019/0329357 A1 Oct. 31, 2019

Related U.S. Application Data

(60) Provisional application No. 62/424,065, filed on Nov. 18, 2016.

(51) Int. Cl.
*B23K 26/354* (2014.01)
*B23K 26/0622* (2014.01)
(Continued)

(52) U.S. Cl.
CPC ........ *B23K 26/354* (2015.10); *B23K 26/0006* (2013.01); *B23K 26/064* (2015.10);
(Continued)

(58) Field of Classification Search
CPC .............. B23K 26/354; B23K 26/0622; B23K 26/064; B23K 26/0006; B23K 26/0608;
(Continued)

(56) References Cited

U.S. PATENT DOCUMENTS 4,649,351 A * 3/1987 Veldkamp ........... H01S 3/08009
359/349
5,302,798 A * 4/1994 Inagawa .............. B23K 26/067
219/121.7
(Continued)

*Primary Examiner* — Jimmy Chou
(74) *Attorney, Agent, or Firm* — Yuri B. Kateshov, Esq.; Carloine J. Roush, Esq.

(57) ABSTRACT

A multiple wavelength laser processing system is configured with a multiple wavelength laser source for generating a multiple wavelength coaxial laser processing beam. The laser processing system further includes a multiple wavelength optical system to deliver the coaxial laser processing beam to a laser-material interaction zone on the surface of a workpiece such that each of the first and a second laser wavelengths in the processing beam impinge at least a portion of the interaction zone as respective first and second concentric laser spots. The multiple wavelength optical system includes a multiple wavelength beam collimator, a configurable chromatic optic, and a laser processing focus lens, wherein the configurable chromatic optic provides an adjustment to the relative focus distance of the first and second laser wavelengths.

5 Claims, 5 Drawing Sheets

(51) Int. Cl.
  *B23K 26/064* (2014.01)
  *B23K 26/00* (2014.01)
  *B23K 26/06* (2014.01)
  *B23K 26/067* (2006.01)
  *B23K 103/10* (2006.01)
  *B23K 103/12* (2006.01)
  *B23K 103/00* (2006.01)
  *B23K 103/08* (2006.01)

(52) U.S. Cl.
  CPC ........ *B23K 26/067* (2013.01); *B23K 26/0608* (2013.01); *B23K 26/0617* (2013.01); *B23K 26/0622* (2015.10); *B23K 26/0648* (2013.01); *B23K 26/0652* (2013.01); *B23K 2103/08* (2018.08); *B23K 2103/10* (2018.08); *B23K 2103/12* (2018.08); *B23K 2103/52* (2018.08); *B23K 2103/54* (2018.08)

(58) Field of Classification Search
  CPC ............ B23K 26/0617; B23K 26/0652; B23K 26/067; B23K 2103/10; B23K 2103/12; B23K 2103/52; B23K 2103/54; B23K 2103/08
  USPC .............. 219/121.6, 121.61, 121.66, 121.76, 219/121.78, 121.79
  See application file for complete search history.

(56) References Cited

U.S. PATENT DOCUMENTS

| | | | | |
|---|---|---|---|---|
| 5,384,803 A * | 1/1995 | Lai | .......................... | G02B 27/09 372/100 |
| 5,399,835 A * | 3/1995 | Nakata | .................... | B23K 26/04 219/121.78 |
| 5,761,234 A * | 6/1998 | Craig | ................ | H01S 3/094003 372/33 |
| 5,805,748 A * | 9/1998 | Izawa | .................... | G02B 27/09 372/71 |
| 6,005,717 A * | 12/1999 | Neuberger | ............. | G02B 27/09 359/618 |
| 6,184,490 B1 * | 2/2001 | Schweizer | ........... | G02B 27/145 219/121.77 |
| 6,240,116 B1 * | 5/2001 | Lang | .................. | G02B 19/0028 372/50.12 |
| 6,310,701 B1 * | 10/2001 | Lizotte | .................... | B23K 26/04 359/15 |
| 6,353,502 B1 * | 3/2002 | Marchant | ............... | G02B 3/005 359/619 |
| 6,356,574 B1 * | 3/2002 | Craig | ................ | H01S 3/094003 372/50.1 |
| 6,410,884 B1 * | 6/2002 | Hackel | .................. | B23K 26/356 219/121.85 |
| 6,462,306 B1 * | 10/2002 | Kitai | ...................... | B23K 26/08 219/121.77 |
| 6,521,866 B1 * | 2/2003 | Arai | .................... | B23K 26/0622 219/121.73 |
| 6,621,044 B2 * | 9/2003 | Jain | ...................... | G03F 7/70216 250/492.1 |
| 6,718,088 B2 * | 4/2004 | Okazaki | .................. | G02B 6/4204 372/6 |
| 6,809,290 B2 * | 10/2004 | Gross | ................... | B23K 26/067 219/121.73 |
| 6,987,240 B2 * | 1/2006 | Jennings | ............. | B23K 26/032 219/121.8 |
| 7,068,690 B2 * | 6/2006 | Okazaki | ................ | H01S 5/4012 372/36 |
| 7,078,650 B2 * | 7/2006 | Gross | ................... | B23K 26/067 219/121.71 |
| 7,082,150 B2 * | 7/2006 | Momiuchi | ............ | H01S 3/0604 372/75 |
| 7,164,099 B2 * | 1/2007 | Hata | .................. | B23K 26/0673 219/121.79 |
| 7,310,186 B2 * | 12/2007 | Lerner | ................ | G02B 27/0905 359/641 |
| 7,435,927 B2 * | 10/2008 | Bruland | ............. | B23K 26/0613 219/121.68 |
| 7,551,652 B1 * | 6/2009 | Jiang | ...................... | H01S 3/102 372/12 |
| 7,671,295 B2 * | 3/2010 | Sun | .................... | H01L 21/76894 219/121.6 |
| 7,674,999 B2 * | 3/2010 | Jennings | ............ | B23K 26/0738 219/121.65 |
| 7,813,389 B2 * | 10/2010 | Peng | .................. | H01S 3/06754 372/26 |
| 7,970,199 B2 * | 6/2011 | Yoshida | .............. | G01B 11/2441 382/145 |
| 7,982,160 B2 * | 7/2011 | Baird | .................. | B23K 26/0853 219/121.68 |
| 8,148,663 B2 * | 4/2012 | Adams | ............... | B23K 26/0622 219/121.75 |
| 8,158,493 B2 * | 4/2012 | Shah | ...................... | B23K 26/082 438/463 |
| 8,390,795 B2 * | 3/2013 | Kotler | ................ | B23K 26/0676 356/4.02 |
| 2001/0050931 A1 * | 12/2001 | Iso | ........................ | B23K 26/06 372/25 |
| 2002/0050488 A1 * | 5/2002 | Nikitin | ............... | B23K 26/0604 219/121.64 |
| 2002/0096501 A1 * | 7/2002 | Schultz | .............. | B23K 26/0608 219/121.69 |
| 2002/0167581 A1 * | 11/2002 | Cordingley | ........ | B23K 26/0736 347/173 |
| 2003/0043452 A1 * | 3/2003 | Heist | ..................... | G02F 1/3534 359/326 |
| 2003/0196996 A1 * | 10/2003 | Jennings | .............. | B23K 26/0665 219/121.73 |
| 2004/0056010 A1 * | 3/2004 | Ho | ....................... | G01B 11/272 219/121.78 |
| 2004/0114250 A1 * | 6/2004 | Kato | .................... | G02B 3/0062 359/626 |
| 2004/0134894 A1 * | 7/2004 | Gu | ........................ | H01L 21/485 219/121.68 |
| 2004/0198028 A1 * | 10/2004 | Tanaka | ............... | B23K 26/0853 438/487 |
| 2005/0067388 A1 * | 3/2005 | Sun | .................... | B23K 26/0622 219/121.61 |
| 2005/0098548 A1 * | 5/2005 | Kobayashi | ......... | B23K 26/0622 219/121.73 |
| 2005/0279736 A1 * | 12/2005 | Bruland | ............. | B23K 26/0613 219/121.8 |
| 2006/0065640 A1 * | 3/2006 | Lizotte | ................ | B23K 26/0622 219/121.61 |
| 2006/0108337 A1 * | 5/2006 | Gu | ......................... | B23K 26/40 219/121.69 |
| 2006/0128073 A1 * | 6/2006 | Sun | ..................... | H01L 23/5258 438/132 |
| 2006/0198402 A1 * | 9/2006 | Hodgson | ............ | H01S 3/2383 372/22 |
| 2006/0261051 A1 * | 11/2006 | Unrath | ............... | B23K 26/0604 219/121.8 |
| 2006/0262408 A1 * | 11/2006 | Kato | .................. | G02B 27/0994 359/618 |
| 2007/0076215 A1 * | 4/2007 | Toida | ................ | G01B 9/02048 356/497 |
| 2007/0235418 A1 * | 10/2007 | Park | .................... | B23K 26/0613 219/121.6 |
| 2007/0272669 A1 * | 11/2007 | Comley | ............. | B23K 26/0608 219/121.76 |
| 2008/0023447 A1 * | 1/2008 | Holmgren | .......... | B23K 26/0608 219/121.6 |
| 2008/0094640 A1 * | 4/2008 | Cordingley | ........ | B23K 26/0643 356/614 |
| 2008/0121627 A1 * | 5/2008 | Bruland | .............. | H01L 23/5258 219/121.67 |
| 2008/0164240 A1 * | 7/2008 | Cordingley | ............ | B23K 26/40 219/121.61 |
| 2008/0210671 A1 * | 9/2008 | Jennings | ............. | B23K 26/0613 219/121.61 |

(56) References Cited

U.S. PATENT DOCUMENTS

| | | | | |
|---|---|---|---|---|
| 2009/0120915 A1* | 5/2009 | Tagawa | ............ | B23K 26/0608 219/121.62 |
| 2009/0126870 A1* | 5/2009 | Zadoyan | ............ | B23K 26/082 219/121.61 |
| 2009/0242522 A1* | 10/2009 | Baird | ............ | B23K 26/03 219/121.61 |
| 2009/0242531 A1* | 10/2009 | Baird | ............ | B23K 26/0622 219/121.81 |
| 2009/0323741 A1* | 12/2009 | Deladurantaye | ....... | B23K 26/40 372/25 |
| 2010/0089881 A1* | 4/2010 | Bruland | ............ | H01L 21/76894 219/121.68 |
| 2010/0116801 A1* | 5/2010 | Mukai | ............ | B08B 7/0042 219/121.85 |
| 2012/0061356 A1* | 3/2012 | Fukumitsu | ............ | B28D 5/0005 219/121.61 |
| 2012/0092755 A1* | 4/2012 | Baird | ............ | B23K 26/0622 359/328 |
| 2012/0100348 A1* | 4/2012 | Brookhyser | ............ | B41M 5/24 428/195.1 |
| 2012/0152915 A1* | 6/2012 | Srinivas | ............ | B23K 26/40 219/121.61 |
| 2012/0160814 A1* | 6/2012 | Osako | ............ | B23K 26/0624 219/121.61 |
| 2012/0201107 A1* | 8/2012 | Peng | ............ | G11B 5/6088 369/13.24 |
| 2012/0312790 A1* | 12/2012 | Moffatt | ............ | B23K 26/0006 219/121.6 |
| 2012/0325784 A1* | 12/2012 | Moffatt | ............ | B23K 26/03 219/121.61 |
| 2013/0134139 A1* | 5/2013 | Duerr | ............ | B23K 26/22 219/121.63 |
| 2013/0172862 A1* | 7/2013 | Suckewer | ............ | A61B 18/20 606/9 |
| 2013/0183833 A1* | 7/2013 | Duan | ............ | B23K 26/0643 438/778 |
| 2013/0277340 A1* | 10/2013 | Liu | ............ | B23K 26/128 219/121.61 |
| 2014/0263208 A1* | 9/2014 | Karlsen | ............ | B23K 26/354 219/121.61 |
| 2015/0158120 A1* | 6/2015 | Courvoisier | ............ | B23K 26/0613 264/482 |
| 2016/0250714 A1* | 9/2016 | Zhang | ............ | B23K 26/36 219/121.61 |

\* cited by examiner

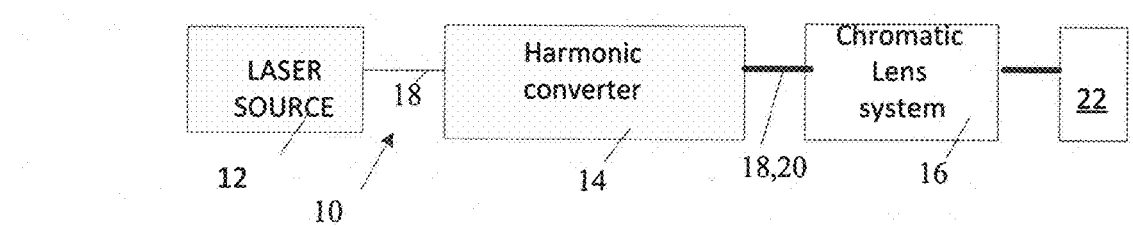
FIG. 1
FIG. 2
Known art
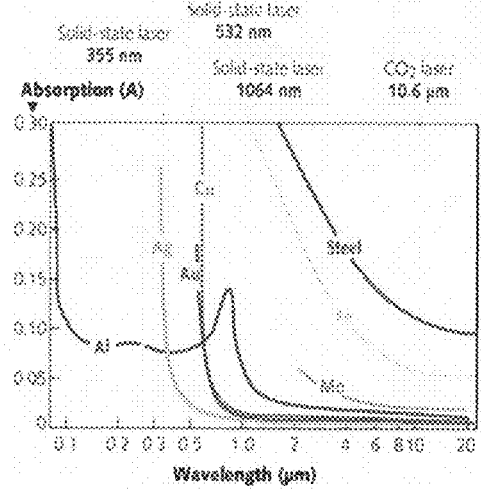
FIG. 3
Known art
| Absorption Ratio → | IR:GR | IR:UV | IR:DUV |
|---|---|---|---|
| Steel | 75% | 50% | 30% |
| Copper | 5% | 1% | 1% |
| Gold | 10% | 5% | 2% |
| Silver | 50% | 5% | 1% |
| Aluminum | 50% | 50% | 50% |
| Silicon | 0.1% | 0.0001% | 0.00001% |
| BK7 | 100% | 1% | 0.1% |
| Sapphire | 100% | 50% | 15% |
| Gorilla Glass | 100% | 100% | 1% |

FIG. 4A IR
FIG. 4B GR
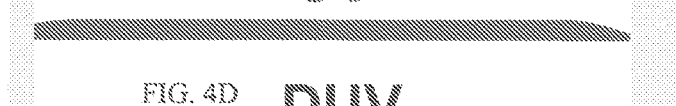
FIG. 4C UV
FIG. 4D DUV
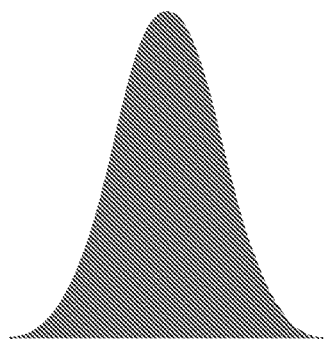
FIG. 5A
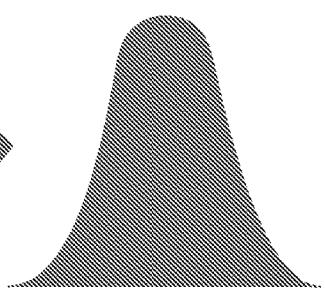
SHG
FIG. 5B
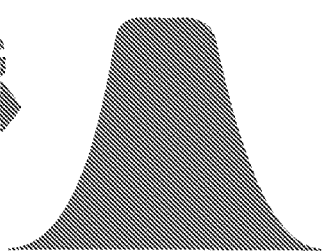
THG
FIG. 5C
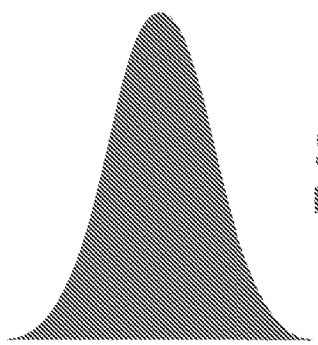
FIG. 6A
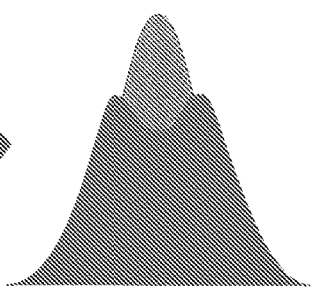
SHG
FIG. 6B
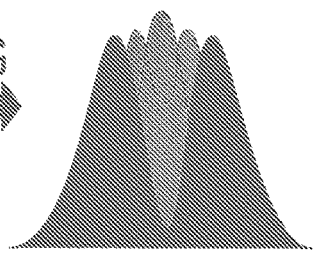
THG
FIG. 6C

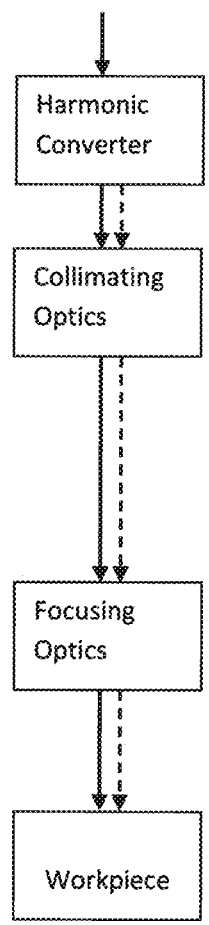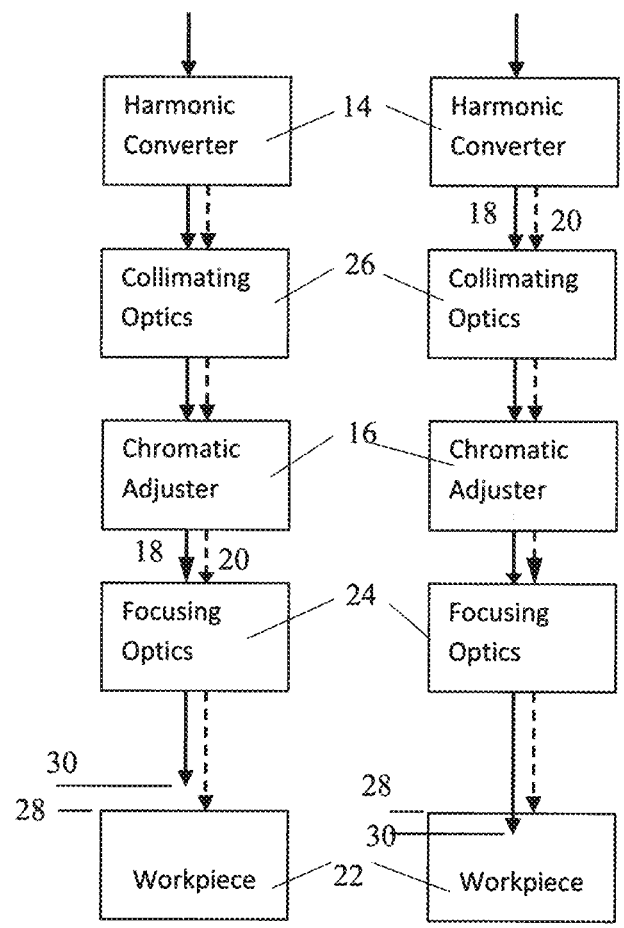
FIG. 7
FIG. 8A
FIG. 8B

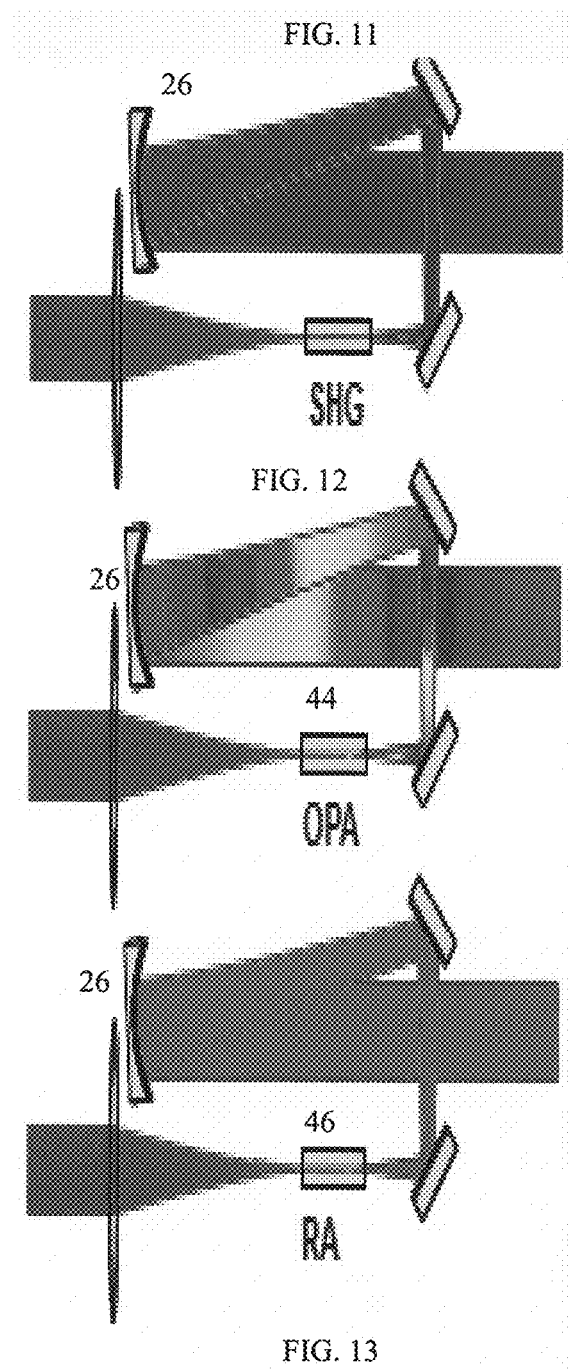

SYSTEM AND METHOD LASER FOR PROCESSING OF MATERIALS

BACKGROUND OF THE DISCLOSURE

Field of the Disclosure

The present disclosure relates to a cost-efficient, fiber laser system and method for processing materials with beams at fundamental and harmonic wavelengths propagating coaxially through a lens system. More particularly, the disclosure relates to independently controlling fundamental and harmonic beam parameters.

Background Art Discussion

Laser processing has been associated with a wide variety of materials including polymers, metals, glasses and ceramics. The type of laser that is used for each material is chosen to match the optical absorption characteristics of the material. This however is not straightforward for numerous materials because they have dramatically different properties. Some materials have surfaces that reflect certain wavelengths, but under certain thermal conditions, allow otherwise reflected beams to propagate through. Still other materials selectively absorb certain wavelengths. And yet other materials simply cannot be effectively processed by one group of wavelengths, whereas the other wavelength group is highly effective for processing these materials.

Many products are manufactured from materials characterized by high reflectivity in ultraviolet (UV) to infrared (IR) wavelength range. This group of materials includes, among others, silicon (Si), copper (Cu), bronze, brass, aluminum (Al), stainless steel with a mirror polish, silver (Ag), gold (Au), platinum (Pt), and alloys of the above mentioned materials. These materials may reflect up to 92% of visible light and up to 98% of infrared radiation at room temperature. Needless to say the materials mentioned above along with other similar/materials are critical in numerous industrial applications.

The US 2013/0134139 publication application (US '139) is one publication recognizing the above-discussed problem. It discloses a fiber laser system for processing highly reflective materials by laser generated light in a 700-1200 nm wavelength range. The reference discloses a conceptually simple process including simultaneous irradiation of the materials of interest with two beams at respective fundamental and doubled frequency. The Green beam at the doubled frequency melts the irradiated surface leading to a more efficient absorption of the IR light at the fundamental frequency. This irradiation at two different frequencies of the material of interest is well known in the art from, for instance, U.S. Pat. No. 5,083,007.

The solution disclosed in US '139 includes controlling the temporal pulse shape by spiking IR light intensity over a short, initial time period of each pulse which leads to higher wavelength conversion efficiency of the IR beam into the Green beam. The generated Green beam raises the temperature of the irradiated material to a melting temperature which increases the absorption of the Red light. The power profile of each pulse after the initial peak power spike is controlled by minimizing the peak power of the IR light to the end of each pulse.

Considering the operation of the disclosed method and equipment of the US '139, it is helpful to evaluate its cost efficiency. On a large industrial scale, relatively low-cost devices capable of effectively functioning translate into higher profits. Within the context of laser-treating processes of the materials of interest, the low cost and effectively functioning laser systems include a plethora of considerations challenging the designer. For example, fiber lasers are making a significant impact on the industrial manufacturing market due to its low cost, low maintenance and increased efficiency in comparison to Nd: YAG lasers of U.S. Pat. No. 5,083,007. The US '139 teaching a quasi-continuous fiber laser may have a few disadvantages which drive up its cost efficiency. Aiming at high conversion efficiency even for a short time, this reference teaches a coherent, narrowband laser associated with the desired high conversion efficiency. However narrowband fiber lasers with a spectral width of less than 2 nm may come at high costs and lower peak power. Controlling a pulse power profile requires sophisticated control circuits which may only add to the cost of the disclosed equipment. In summary, the disclosed equipment may not be economically attractive for a large-scale material laser processing business.

A need therefore exists for a simple, cost-efficient material processing laser system.

Another need exists for a simple, cost-efficient material processing fiber laser system to efficiently process metal, dielectric or composite materials that are not processed well or are processed at excessive average powers at the fundamental frequency of the fiber lasers.

Still another need exists for a simple, cost-efficient modular material processing fiber laser system operative to limit the average laser power or pulse energy which is coupled into the material and usually dissipated in the form of heat.

Yet another need exists for the above noted fiber laser system configured with beam guiding optics which is operative to provide necessary conditions for energy efficient processing.

SUMMARY OF THE DISCLOSURE

In its basic configuration, the disclosed laser processing system is configured with a laser source outputting a first beam at a fundamental wavelength with a spectral width of at least 2 nm. Utilizing a high harmonic wavelength generator the first beam is converted once or multiple times to generate at least one second beam at least one harmonic wavelength. The beams are propagated coaxially by an optical system delivering them to the interface of laser radiation and material where one of the beams, typically the second beam at the harmonic wavelength is at least partially absorbed to induce a change of the material state in which the absorption of the beam at the fundamental wavelength is increased. It should be noted that in limited cases the inducement of the material state change is caused by the first beam at the fundamental wavelength.

The material state change may be induced on a macro level including temperature changes and a transition among solid/liquid/gas/plasma phases of the irradiated material. Alternatively, the material state can occur on a micro level switching the material from ground or excited state to another excited or ionized or transition state leading to a chemically modified change.

Typically, the focus of the second beam is located on the surface of the material. However depending on material and/or harmonic wavelength, a focus of the second beam may be closely spaced from the surface in axial directions. Once a threshold at which the material changes its state is reached, the absorption of the first beam is markedly increased resulting in the improved efficiency of the task at hand. In some applications, the first beam induces the material state change, whereas the second beam complete the task at hand.

One aspect of the disclosed systems is the generation of chromatic aberration, which is not typical in the laser material machining art which often discloses achromatic lenses or lens systems. Accordingly, the disclosed optical beam delivering system is configured with a lens or lens system that is chromatic.

The chromatic lens is configured to collect light at multiple different wavelength and focus them at different focal heights relative to the surface. The chromatic aberration is generally axial, i.e., along the beam propagation path. Lateral chromatic aberration may be or may remain corrected in the chromatic system.

Another aspect of the disclosed system complements the chromatic aberration and advantageously distinguishes the currently disclosed structure from those of the known prior art. Briefly revising the US '139, it teaches optimizing the energy balance by controlling the power profile of each pulse. The pulse shape control is designed to initially increase IR peak power to efficiently generate Green light so as to reach a melting temperature and then gradually decrease the peak power by the end of each pulse. In other words, the efficiency of the processing system to treat material is controlled by varying the wavelength conversion efficiency during each pulse.

Thus a further aspect of the disclosure including the above-mentioned feature emphasizes controlling two or more coaxial beams at respective fundamental and harmonic wavelength. In at least one embodiment, the disclosed system is configured with a processor for controlling a fluence ratio between the beams to be at least equal to the inverse absorption coefficients ratio at which the second beam provides a material state change. In a simple illustration of the above advantages of the disclosed system a 10 kW fiber laser source typical of prior art systems is replaced with a substantially less powerful laser, for example a 1 kW fiber laser with a small portion of its power converted to different harmonic wavelength.

In practical terms, this control may be fulfilled by setting or adjusting the relative focus distance of the first and second beams with the chromatic optics disposed. By doing so the diameter ratio of first and second laser spots associated with respective first and second beams at the surface is adapted to vary the fluence ratio. The chromatic optic may be removed from the path of the coaxial beam and subsequently replaced by another configured to provide different focal distances, different diameter ratio, and thus different fluence ratio.

In still another aspect of the disclosed system, the beam delivering system includes an achromatic collimator provided with one or more reflective surfaces. This feature has been found particularly useful in the disclosed system with the beam at a fundamental wavelength and multiple harmonic beams, such as Green and ultraviolet (UV) or Green, UV and deep UV (DUV). The preservation of the beams' parallelism plays a particularly important role in light of the chromatic lens system and desired focal distance differences providing the desired fluence ratio. The collimator is advantageously configured without refractive elements due to extremely high tolerances on lateral chromatic effects.

Yet another aspect of the disclosed system provides an analytical determination of the ratio of the energy thresholds of the material state changes for each of the incident beams. The energy threshold determination was developed by J. M Liu in the paper "Simple technique for measurement of pulsed Gaussian-beam spot size" Optics Letters, Vol. 7, May 1982 fully incorporated herein by reference. In particular, the energy of each of the multiple beams delivered to the workpiece to be machined is determined as $E\text{th}(\lambda)/E\text{thall}(\lambda) > 1,$ wherein $E\text{th}(\lambda)$ is the energy threshold of each individual beam which is needed to process the workpiece alone without the assistance of other wavelengths, and $E\text{thall}(\lambda)$ is the energy threshold of the same laser beam in the composite beam of the disclosure, i.e. when all wavelengths are present simultaneously.

The wavelength converter implemented in all aspects of this disclosure is not limited to a nonlinear crystal (NLC). It may also be a Raman crystal or even a Raman fiber—amplifier and oscillator—receiving the beam at the fundamental wavelength from the fiber laser source. Alternatively an optical parametric amplifier or oscillator may be used as well. Incorporating the parametric and Raman conversion schemes allows generating spectrally tunable wavelength that may be more efficient in changing the surface state of some processing materials than the limited number of harmonics at fixed harmonic wavelength of the beam at the fundamental wavelength.

When laser beams impinge on a material, the energy coupling is determined by the absorption. The temperature of the material rises as a result of the absorbed power. For an intense laser, the temperature can rise beyond melting and vaporization temperatures, and the material becomes an ionized plasma. In this situation, the subsequent laser absorption is determined by the plasma properties, such as density and temperature. In many materials processing applications, creating a plasma facilitates the absorption of laser energy. This is the subject matter of another aspect of the disclosure that may help operation of the disclosed system in each of the above discussed aspects.

The above discussed aspects include specific features of the disclosed laser system which implements respective steps of the disclosed method. Hence all of the above-discussed aspects and some additional features which are disclosed below in the specific description of the drawings directly relate to the disclosed method. Each of the above-disclosed aspects includes a feature or features that can be practiced with features of any combination of or all aspects.

BRIEF DESCRIPTION OF THE DRAWINGS

The above and other features and advantages of the present disclosure will become more readily apparent from the specific description and claims accompanied by the following drawings, in which:

FIG. 1 is an exemplary disclosed system.

FIG. 2 is the absorption of multiple materials dependence on a wavelength.

FIG. 3 is a table illustrating the known absorption ratio of beams at fundamental and harmonic wavelengths by multiple materials.

FIGS. 4A-4D CW illustrate conversion efficiency of light at IR, Green, UV and DUV wavelengths.

FIGS. 5A-5D illustrate beam shape dependence with low wavelength conversion efficiency.

FIGS. 6A-6C illustrate a pulse shape dependence on the wavelength conversion efficiency.

FIG. 7 a diagrammatic illustration of unadjusted chromatic aberration.

FIGS. 8A and 8B a diagrammatic illustration of adjusted chromatic aberration.

FIGS. 9-11 illustrate respective wavelength conversion schematics based on nonlinear crystals and used in the disclosed laser system of FIG. 1.

FIGS. 12 and 13 illustrate respective Raman and parametric wavelength conversion schematics.

SPECIFIC DESCRIPTION

Figure 9:
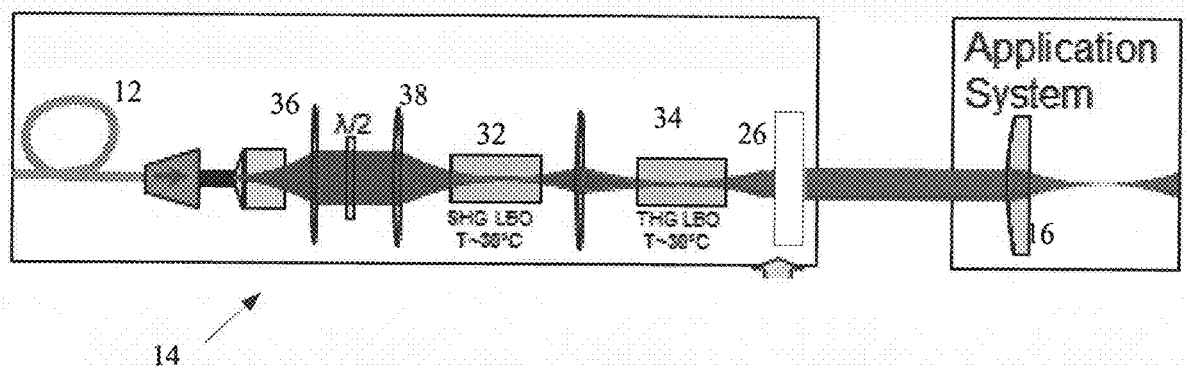

The basic concept of this disclosure includes laser treating a workpiece with two or more laser beams at different wavelengths which are differently absorbed by the material to be treated. The energy of one of the beams at the wavelength, which is absorbed more effectively than that of the other beam, is coupled into the material inducing a material state change. With the material change occurred, the workpiece effectively absorbs the other beam or beams at respective wavelengths. Optimization of the disclosed process allows the disclosed method and system successfully treat practically any material. For example, it can be glass, sapphire, ceramics, copper, corroded metals, thin metals, biotissues, PCBs and silicon wafers.

FIG. 1 illustrates a general layout of a disclosed material processing system 10. The illustrated configuration includes a laser source 12 outputting a broadband unpolarized beam 18 at a fundamental wavelength with a spectral line ranging between 2 nm and hundreds of nm. While laser source 12 may have a variety of configurations, preferably it is a fiber laser that can operate in all three regimes: continuous wave (CW), quasi CW (QCW) and pulsed. In QCW or pulsed regimes, laser source 12 outputs a train of pulses each having a pulse energy in a µJ-J range, pulse duration in a seconds-femtosecond range, and average power between single-digit watt and hundreds of kilowatts. While many industrial applications require that output beam 18 have the highest quality with a factor $M^2$ of 1, the disclosed method and system can also efficiently operate with a multimode beam having the $M^2$ of up to 100.

The generation of harmonic beams at respective wavelengths different from that of beam 18 is realized by a harmonic frequency convertor 14. The latter may operate on a basis of different physical mechanisms, but ultimately regardless of the configuration, converter 14 is operative to partially convert the wavelength of beam 18 to a different wavelength of beam 20 with a spectral line width exceeding 0.5 nm. Within the scope of the disclosure, frequency harmonic converter 14 may be operative to use a variety of conversion processes including frequency doubling, sum and difference frequency generation in nonlinear crystals, parametric oscillation and amplification in nonlinear crystal materials, and Raman conversion in bulk crystals or in optical fibers. Examples of specific optical schematics are discussed in detail below.

Propagating down the light path in a coaxial manner, beams 18 and 20 impinge on a chromatic adjuster 16 configured with one or multiple lenses as explained below. The chromatic lens system 16 generates an axial chromatic aberration between the first and second beams which further simultaneously impinge on a workpiece made from material 22. When using chromatic system 16, beam 18 at the longer wavelength beam will have a focus axially shifted from that of beam 20 at the shorter wavelength which is on or near the surface of material 22. As a consequence of the axial shift, at the focal point of beam 20, beam 18 forms a spot diameter larger than that of beam 20. Hence the intensity of beam 18 at the longer wavelength at the focal point of beam 20 is significantly lower than at its own focal point. Because of the difference in spot diameters at the workpiece and the wavelength conversion efficiency, the fluence ratio between beams 20 and 18 is usually 2-10 times higher, depending on the configuration of chromatic lens system 16, than in case of chromatic lens systems of the prior art, wherein the fluence is the pulse energy per beam areas in case of QCW and pulsed lasers, and power per beam area for CW lasers.

The fluence ratio is important for disclosed system 10 that is configured to control a minimal amount of beam 20 needed to provide the desired material state change leading to the increased absorption of beam 18 and thus to more efficient use of the entire system. Note that utilizing high power laser source 12, in many cases, beam 18, such as an IR beam, can laser treat many materials, but the use of only one IR beam 18 would lead to unacceptably inefficient process. The same relates to any other single wavelength light that in principle may individually treat material 22, but may render the laser treatment process inefficient. The use of multiple beams instead of processing the same material with one beam can be analytically expressed as $$Eth(\lambda)/Ethall(\lambda) > 1,$$

wherein $Eth(\lambda)$ is the energy threshold of each individual beam which is needed to process the workpiece alone without the assistance of other wavelengths, and $Ethall(\lambda)$ is the energy threshold of the same laser beam in the multi-beam of the disclosure, i.e. when all wavelengths are present simultaneously. When the above is met the efficiency of the process utilizing the disclosed system can be enhanced by orders of magnitude in some applications. Typical pulse energies in the applications with multiple beams are 4-5 times the single pulse threshold energies Eth.

The fluence ratio between beams 20 and 18 in system 10 is obtained on the basis of well documented dependence of absorption according to wavelength for various materials at ambient temperature, as shown in FIG. 2. The inventors discovered that in order to induce the desired material state change, the fluence ratio should be at least equal to or larger than the inverse absorption ratio for the same beams in material 22. Some of the absorbance ratios are illustrated in FIG. 3, wherein IR is infrared, GR is green, UV—ultraviolet and DUV is deep UV. Numerous techniques for measuring and controlling fluence are known to one of ordinary skill in the art and not disclosed here in detail. It should be noted that in the disclosed system the fluence of respective beams is measured separately.

The fluence ratio can be adjusted by several techniques. One of the techniques includes manipulating the chromatic aberration of chromatic adjuster 16 by replacing currently installed lens set with a different one which may be made from different materials, such as fused silica (FS), magnesium fluoride (MGF2), calcium fluoride (CAF2) and others. Still another technique provides for adjusting the conversion efficiency. The selection of chromatic adjuster 16 appropriate for the task at hand can be realized by any mechanical method including an automated lens delivering mechanism. The techniques for adjusting parameters of the wavelength conversion are also well known to one of ordinary skill in the laser arts and may include controllably varying the geometry and temperature of NL crystals or the length of Raman fiber and many others. While the conversion is controllably adjusted, the power profile of pulses, as shown in FIGS. 4A-4D, remains practically unchanged.

Typically the laser used in laser material processing are configured narrow band and polarized to provide good harmonic conversion efficiencies. However, the high conversion efficiency comes with significant degradation of the fundamental beam profile, as shown in FIGS. 6A-6C illustrating a gradual transformation of Gaussian profile to a donut-shaped profile through subsequent second and third harmonic conversions. The donut-shaped profile is generally detrimental except for a very few applications. Most of the times, a Gaussian-profile beam is used. Both the low conversion efficiency and broad spectral line decrease the efficiency which leads to a relatively unmodified Gaussian profile as shown in FIGS. 5A-5C. Thus, low conversion efficiency is beneficial for generating multiple beams from a single laser, as disclosed here, and provides a good beam quality for all of the beams. For the purposes of this disclosure, the low conversion efficiency for Green beam 20 is less than 20%, whereas high efficiency may be more than 50%; for UV light anything below 10% is considered low, whereas the conversion efficiency above 30% is high.

FIG. 7 illustrates an optical schematics with unadjusted chromatic aberration. In an achromatic system, both beams impinging the workpiece are focused on its surface. However, the unadjusted system may have some amount of uncorrected chromatic aberration.

FIGS. 8A and 8B illustrate respective optical configurations with the addition of chromatic adjuster 16. As mentioned above, beam 18 at the first wavelength is converted in harmonic converter 14 such that at least two coaxial beams 18, 20 at respective longer and shorter wavelengths are collimated in collimating optics 26. The collimated beams are received by chromatic adjuster 16.

With broadband laser source 12 and with multiple laser wavelengths, a monochromatic processing lens design will generally exhibit so-called chromatic aberrations. These aberrations are a result of material dispersion, variations in the index of refraction with wavelength. With different indices of refraction, the focal length of the lens depends on the wavelength, and results in axial chromatic aberration where different wavelengths focus at different focal distances.

The chromatic adjuster may have a variety of configurations. For example, an air-spaced chromatic doublet of suitable optical materials may be used as a chromatic corrector to adjust the beam collimation of one wavelength relative to another as input to the processing lens to correct axial chromatic aberrations of a processing lens or to intentionally add chromatic aberration for focal distance separation at multiple wavelengths.

The chromatic doublet may have a long focal length or infinite focal length (i.e. afocal) at one wavelength to maintain beam collimation. The doublet may be air-spaced and utilize a combination of durable optical glass and crystalline laser materials. In particular with high power lasers and an ultraviolet wavelength, a combination of FS, MGF2, and CAF2 may be used. In combination with the material of the processing lens, two materials can correct or separate focal distances at two wavelengths and three materials can correct or separate focal distances at three wavelengths. To increase the focal distance for example, at 1064 nm relative to a shorter wavelength, the doublet may include a positive element with a relatively high dispersion and a negative element with a relatively low dispersion. For example, the doublet may include a positive FS element and a negative CAF2 element with nearly equal focal lengths. It will be appreciated that more complex chromatic corrector optical designs with more than 2 optical elements may be required for correcting other optical aberrations such as spherical aberration.

Thereafter the beams 18, 20 are focused by focusing optics 24 to have respective desired beam spot diameters. Delivered to a laser-material interaction zone on the surface of workpiece 22, beams 18, 20 impinge on the surface as respective first and second concentric laser spots. In FIG. 8A, chromatic adjuster 16 is configured such that focus 30 of first beam 18 is located upstream from the surface of workpiece 22, whereas in FIG. 8B focus 30 lies below the surface. In both configurations, a focus 28 of converted beams 20 is on the surface of workpiece 22.

The laser spot diameter ratio between beams 18 and 20 is adjusted by configuring chromatic adjuster 16 such that the smaller concentric spot is less than 2 the diameter of the larger concentric spot. The chromatic adjuster may be configured with interchangeable sets of chromatic optics 16 each set defining respective focus distance which are different from one another.

Figure 10:
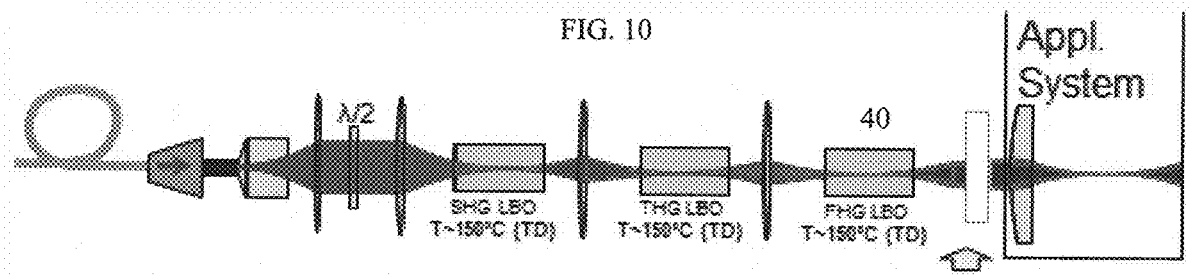

FIGS. 9-13 disclose various configurations of harmonic converter 14. The illustrated architectures of the converter 14 may include a single-pass scheme as shown in FIGS. 9-11 or folded pass conversion scheme seen in FIGS. 12-14.

Referring specifically to FIGS. 9-10 converter 16 is operative to generate second harmonic and third harmonic frequencies by utilizing nonlinear type I crystals 32 and 34, such as lithium triborate (LBO). In operation, beam 18 emitted from laser 12 is incident on a collimating lens 36, then rotated by a half wavelength plate and focused within the body of crystal 32 such that beams 18 and 20 propagate thereafter in the coaxial manner. As readily understood, if the schematic of FIG. 9 had only crystal 32, converter 14 would output only two beams as depicted in FIG. 12. But because second crystal 34 is incorporated, the shown schematic is operative to generate third harmonic as well whereas the lens between the crystals is shown for convenience although in reality it is one or more spherical mirrors.

All of the beams are concentric with the outer beam being beam 18 and innermost beam being the third harmonic beam. The collimating optics 26 is placed along the light path downstream from crystal 34 and may be configured as one or more spherical mirrors. The chromatic adjuster 16 is located downstream from collimator 26. FIG. 10 has a structure identical to the structure of FIG. 9, but in addition to second and third harmonics, it is operative to generate a fourth harmonic by a third crystal 40.

FIGS. 11-13 illustrate a folded past conversion system. In FIG. 11, the schematic is operative to generate a second harmonic with collimating optic configured as achromatic, all-reflective collimator 26. FIG. 12 illustrates an alternative harmonic generation by utilizing optical parametric amplifier (OPA) 44. It has a spectral tunability between 0.2-2 µm by varying one or more parameters of the system such as temperature and/or crystal rotation and/or time delay, to name a few. It is typically realized in multiple nonlinear crystals in series or in a cavity functioning as an optical parametric oscillator (OPO). FIG. 14 illustrates a Raman amplifier which can be configured as Raman fibers or Raman crystal 46 or Raman fluids. Similarly to the OPO, it can be realized in a cavity to function as a Raman oscillator.

Having described the embodiments of the present invention with reference to the accompanying drawings, it is to be understood that the invention is not limited to those precise embodiments. For example, system 10 may be configured with a long pulse IR source with a coaxial, temporally preceding high intensity (ns/ps) pulse of IR/Green/UV/DUV, MM IR beam, with a coaxial single mode IR to create the material state change in the focus, and others. Thus it is understood that various changes, modifications, and adaptations may be effected therein by one skilled in the art without departing from the scope or spirit of the invention as defined in the appended claims.

The invention claimed is:

1. A modular system for machining a workpiece, comprising:
   a laser source outputting a broadband first beam at a fundamental wavelength along a path;
   a harmonic wavelength generator receiving the first beam and operative to partially convert the first beam into at least one second beam at a harmonic wavelength, wherein the first and the second beams are coaxially and temporally overlapped; and
   an adjustable non-achromatic optics impinged upon by the coaxial first and second beams and configured to controllably generate a chromatic aberration such that the second beam has a focal plane on or near a surface of the workpiece providing an initial material state change sufficient to increase a temperature for a subsequent effective absorption of the first beam with a focal plane spaced away from the surface into a body of the workpiece; and
   a processing unit configured to determine a fluence ratio of the first and second beams at respective fundamental and harmonic wavelength and adjust the non-achromatic processing lens or lens system such that the second beam at the higher wavelength generating spark, wherein the fluence ratio is larger or at least equal to the inverted ratio of a absorption coefficients at the fundamental and harmonic wavelength.

2. The modular system of claim 1, wherein the processing unit is operative to adjust a wavelength conversion efficiency of the harmonic generator to be larger than the inverted absorption coefficient ratio of each of the fundamental and harmonic wavelength.

3. The modular system of claim 2, wherein the processing unit is operative to control the wavelength conversion efficiency to prevent degradation of a Gaussian intensity distribution of the first beam to a donut-shaped intensity distribution during the wavelength conversion.

4. The modular system of claim 2, wherein the wavelength conversion efficiency is controlled to provide a donut-shaped intensity distribution profile of the first beam which can be a single mode or multi-mode beam.

5. A modular system for machining a workpiece, comprising:
   a laser source outputting a broadband first beam at a fundamental wavelength along a path;
   a harmonic wavelength generator receiving the first beam and operative to partially convert the first beam into at least one second beam at a harmonic wavelength, wherein an unconverted portion of the first beam and the at least one second beam are coaxially and temporally overlapped; and
   an adjustable non-achromatic optics impinged upon by the unconverted portion of the first beam and at least one second beam and configured to controllably generate a chromatic aberration such that the at least one second beam has a focal plane on or near a surface of the workpiece providing an initial material state change sufficient to increase a temperature for a subsequent effective absorption of the unconverted portion of the first beam with a focal plane spaced away from the surface into a body of the workpiece,
   wherein the laser source operates so that the energy of each of the first and second beams incident on the workpiece is $$E\text{th}(\lambda)/E\text{thall}(\lambda) > 1,$$

wherein Eth is the energy threshold of a single beam, which is selected from the first and at least one second beams and coupled into the workpiece alone needed to accomplish the laser machining of workpiece, and Ethall($\lambda$) is the energy threshold of the single beam when the unconverted portion of the first beam and at least one second beam impinge on the workpiece simultaneously.

* * * * *